United States Patent [19]

Bourgraf

[11] Patent Number: 4,604,022

[45] Date of Patent: Aug. 5, 1986

[54] TRUNK LOADING DEVICE FOR BUSINESS MACHINES AND THE LIKE

[75] Inventor: Elroy E. Bourgraf, Cincinnati, Ohio

[73] Assignee: Ferno Washington, Inc., Wilmington, Ohio

[21] Appl. No.: 595,978

[22] Filed: Apr. 2, 1984

[51] Int. Cl.[4] .................. B60R 5/04; B65G 67/00
[52] U.S. Cl. .................. 414/340; 254/120; 414/347; 414/391; 414/462; 414/498; 414/522
[58] Field of Search .............. 414/340, 341, 343, 347, 414/391, 446, 462, 463, 465, 466, 498, 522; 296/37.1, 37.2, 37.5; 254/8 C, 10 C, 120; 280/32, 47.24, 47.37 R

[56] References Cited

U.S. PATENT DOCUMENTS

| | | | |
|---|---|---|---|
| 1,241,366 | 9/1917 | Forney | 254/10 C |
| 1,455,727 | 5/1923 | Hill | 254/10 C |
| 2,311,928 | 2/1943 | Buehler | 280/47.24 X |
| 3,118,553 | 1/1964 | Rosenzweig | 414/498 X |
| 3,406,999 | 10/1968 | Kozicki | 296/37.1 X |
| 3,865,427 | 2/1975 | Delany | 414/341 X |
| 3,869,052 | 3/1975 | Leahy | 414/498 X |
| 4,072,319 | 2/1978 | Berger | 280/47.24 X |
| 4,251,178 | 2/1981 | Bourgraf et al. | 414/462 X |
| 4,354,791 | 10/1982 | Antonellis | 414/343 |

FOREIGN PATENT DOCUMENTS 658618  2/1963  Canada ................. 414/462

OTHER PUBLICATIONS

IBM Technical Disclosure Bulletin vol. 22, No. 6, (Nov. 1979), "Lift and Carry Device".

*Primary Examiner*—Leslie J. Paperner
*Attorney, Agent, or Firm*—Frost & Jacobs

[57] ABSTRACT

A lifting mechanism adapted to be placed in the trunk of a vehicle, the lifting mechanism having a lift platform movable from a storage position within the trunk to an elevated position in which the lift platform projects outwardly from the trunk, the platform being raised and lowered by a lever mechanism with or without a powered assist. The lifting mechanism may be used alone or in combination wtih a wheeled cart and an article supporting carriage by means of which the article may be transferred between the cart and the lifting mechanism.

14 Claims, 16 Drawing Figures

TRUNK LOADING DEVICE FOR BUSINESS MACHINES AND THE LIKE

This invention relates to a device for loading and unloading bulky objects from the trunk of an automobile.

BACKGROUND OF THE INVENTION

Salepersons for business machines, such as typewriters, adding machines, bookkeeping machines, word processing equipment and the like, normally carry with them the machines they are to demonstrate and sell. Since these machines are usually of substantial bulk and weight, they are difficult to carry, and as a result various types of carts have been developed to enable the salepersons to transport the machines from their vehicles to the place where the demonstration is to be conducted. Such carts are generally collapsible so that they may be easily stored when not in use. However, when erected, it is still necessary for the salesperson to lift the machine from the vehicle and place it on the cart. This is often difficult to do because of the bulk and weight of the machine, and the problem is magnified where the machine is stored in the trunk of a conventional passenger vehicle. Many salespersons prefer to store the machines in the trunk of a vehicle, as opposed to using a stationwagon, in that the machine is out of sight and the chances of theft are materially reduced. However, because of their weight, the storage of business machines in the trunk of an automobile imposes a very substantial physical strain on the salesperson and increases the chances of the machine being dropped, in which event the damage can be very substantial.

To overcome the problem of removing a heavy business machine from the trunk of an automobile, it has hitherto been proposed in U.S. Pat. No. 4,251,178 to provide a cart construction which included a trunk loading attachment by means of which a business machine could be lifted from the trunk of an automobile and affixed to the cart. While useful for its intended purposes, the device taught in the aforementioned patent is of complicated construction and requires a very substantial amount of manipulation on the part of the user, including the assembly and disassembly of rail members required to transfer the machine to and from the trunk of the vehicle. The construction also relies on the use of a heavy coil spring to counterbalance the weight of the business machine during transfer, which adds to the complexity of the device as well as making it difficult for the user to manipulate the transfer mechanism. In addition, the cart itself is in the nature of a two-wheeled dolly which supported only a part of the weight load, the salesperson bearing the remainder of the load as the dolly was moved from place to place.

The present invention seeks to overcome the difficulties encountered with hitherto known trunk loading devices by providing greater simplified mechanism by means of which a business machine or other bulky objects may be readily loaded and unloaded from the trunk of an automobile.

SUMMARY OF THE INVENTION

A trunk loading device in accordance with the present invention comprises, as its basic component, a lifting mechanism adapted to be placed in the trunk of the automobile. Additional components comprise a wheeled cart which may be of essentially conventional construction, and a carriage for mounting the business machine to be transported, the carriage being transferable directly from the cart to the lift mechanism.

The lift mechanism comprises a base adapted to be seated on the floor of the automobile trunk, the base mounting sets of lever arms which are connected to a lift platform movable from a storage position in which the lift platform seats on the base to an elevated position in which the lift platform is raised so as to clear the trunk opening, detachable handles engagable with one of the sets of lever arms being provided to raise and lower the lift platform Spring assists, such as a gas spring, may be utilized to assist in raising and lowering the platform. The lever arms may be arranged to provide a parallelagram linkage, although preferably the sets of lever arms are of different lengths and may include slotted connections which alter the arc of the lift platform as it is raised and lowered, thereby permitting the handling of higher loads. It will be understood that the lift mechanism may be used as such to deposit and remove diverse objects from the trunk of a vehicle.

Where the objective is to transport a business machine, a carriage is provided which mounts the business machine and is transferable from the lift platform to a wheeled cart, the carriage being provided at its forward end with a pair of rollers and at its rear end with a pair of retractable handles which, when extended, permit the user to lift the rear of the carriage, thereby permitting it to be rolled relative to the lift platform. On its undersurface, the carriage may be provided with rubber cushions which are adapted to seat on the lift platform to hold the platform in position when it is positioned on the lift platform, the lift platform having a stop rail extending along its rearmost edge against which the rollers abut when the carriage is rolled onto the lift platform. The undersurface of the carriage may be provided with a spaced apart pair of inverted generally V-shaped grooves extending from front to rear of the carriage, the grooves being adapted to be aligned with a pair of spaced apart guide wheels mounted on the cart, the guide wheels serving to guide and position the carriage as it is transferred from the lift platform to the cart. In an alternative embodiment, the side frame members of the carriage are arranged to move along configured guide wheels on the cart.

The cart itself may be of essentially conventional construction, preferably being a four-wheeled collapsible cart capable of being adjusted to vary its height. However, instead of a planar top, the cart is provided with spaced apart tubular members extending from front to rear of the cart, the guide wheels for the carriage being mounted at the forward ends of the tubular members. When there are V-shaped grooves in the undersurface of the carriage, the tubular members are arranged to seat in the grooves, the rear face of the carriage has openings therein in alignment with the rear ends of the tubular carriage supporting members, the cart being provided with detachable locking pins which may be inserted through the openings into the adjoining ends of the tubular members to secure the carriage to the cart. In an alternative embodiment, the carriage is locked to the cart by displaceable latches. After the carriage is secured to the cart, the retractable handles on the carriage will be moved to their retracted position on the cart assembly rolled away from the vehicles. The user can then return the lift platform to its storage position and remove the lifting handles so that the trunk may be closed.

When it is desired to return the business machine to the trunk, the trunk is opened, the lifting handles inserted in the ends of the lever arms, whereupon movement of the lifting arms will cause the lift platform to be raised to its elevated position. The cart is wheeled into alignment with the lift platform, the locking pins or latches for the carriage disengaged, and the retractable handles on the carriage extended, whereupon the rear of the carriage may be lifted and the carriage rolled forwardly onto the lift platform, the carriage first rolling on the guide wheels on the cart until the rollers on the front of the carriage make contact with the lift platform, the latter rollers then serving to permit the carriage to be fully seated on the lift platform. The retractable handles on the carriage are then retracted, whereupon the lifting handles engaging the set of lever arms are moved to pivot the lift platform to its storage position within the trunk. The lifting handles are then removed and the cart collapsed for storage.

DESCRIPTION OF THE PREFERRED EMBODIMENTS

Figure 1:
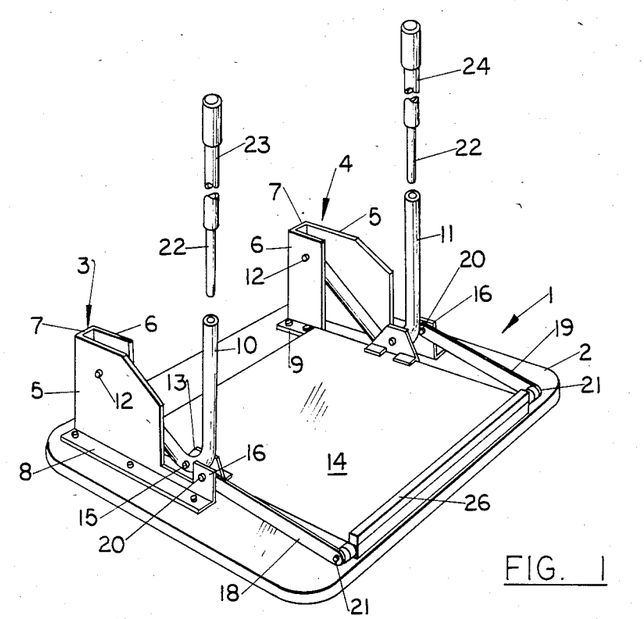
FIG. 1 is a perspective view of the lift mechanism in the storage position, with the lifting handles shown broken away and spaced from the lever arms to which they are attached.

Referring first to FIG. 1, the lift mechanism, indicated generally at 1, comprises a base 2 adapted to be seated on the floor of the automobile trunk, the base being formed from any suitable material, such a wood, metal, or plastic. The base mounts a pair of brackets 3 and 4 which are mirror images of each other, each of the brackets having an outer wall 5 and an inner wall 6 interconnected by an end wall 7, the outer wall 5 having a mounting flange 8 and the inner wall 6 a mounting flange 9 by means of which the brackets are secured to the base 2. A first pair of curved lever arms 10 and 11 are pivotally connected at one end to brackets 3 and 4, respectively, by means of pivot pins 12 extending between the inner and outer walls of the brackets, the pivot pins being spaced upwardly from the base 1. Intermediate their ends, the curved lever arms 10 and 11 are pivotally connected to brackets 13 mounted on opposite sides of lift platform 14 by pivot pins 15, the brackets 13 lying toward the front end of lift platform 15. The outer walls 5 of brackets 3 and 4 each has an extension 16 to which one end of a second pair of lever arms 18 and 19 is pivotally connected by pivot pins 20, the opposite ends of the lever arms 18 and 19 being pivoted at 21 to the lift platform 14 adjacent its rear edge.

Figure 2:
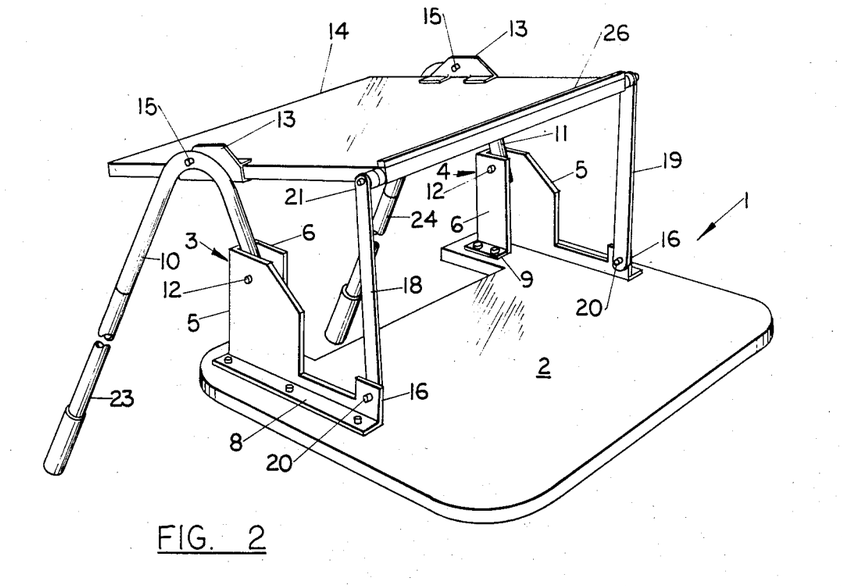
FIG. 2 is a perspective view showing the lift platform in elevated position.
Figures 3, 4, 5:
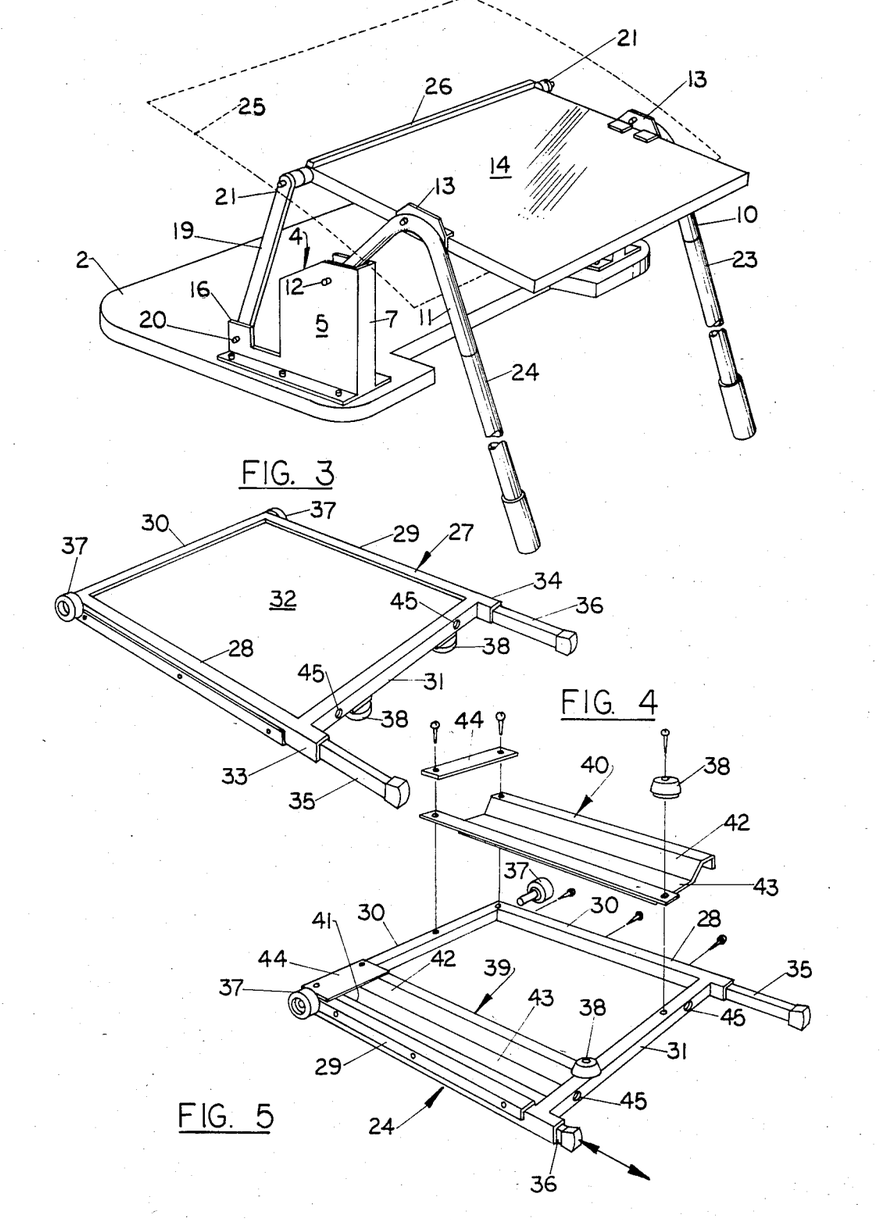
FIG. 3 is a perspective view taken from the opposite side of FIG. 2 and with the outline of the trunk opening illustrated in dotted lines.
FIG. 4 is a perspective view of the carriage with the retracted handles shown in extended position.
FIG. 5 is a partially exploded perspective view of the underside of the carriage showing the V-shaped grooves.

In the embodiment illustrated, the curved lever arms 10 and 11 are formed from tubular stock, such as tubular aluminum, and are adapted to receive the cylindrical pins 22 at the ends of lifting handles 23 and 24. The cylindrical pins 22 will be sized to be snuggly received within the upwardly opening ends of curved lever arms 10 and 11; and detents or other latching devices may be provided to detachably secure the lifting handles 23 and 24 to their respective lever arms. The lifting handles are used to pivot the lift platform 14 from the storage position illustrated in FIG. 1 to the elevated position illustrated in FIG. 2, the sets of lever arms 10, 11 and 18, 19 acting to elevate the lift platform as the handles are used to pivot the curved lever arms 10 and 11 on pivot pins 12, the lift platform moving in an arc. The lift platform will be stabilized in its elevated position either by contact of the curved lever arms 10 and 11 with the upper edges of end walls 7 of brackets 3 and 4, as seen in FIG. 3, or by contact of the inner curved surfaces of lever arms 10 and 11 with the rear edge of the trunk opening, the trunk opening being diagrammatically illustrated by dotted lines 25 in FIG. 3. In either event, the lift platform 14 will be essentially horizontal when in elevated position, although it may be inclined slightly either forwardly or rearwardly depending upon the height of the trunk opening relative to the floor of the trunk. It also will be noted that when the lift platform is in the elevated position, it projects rearwardly from the trunk opening so as to lie in close proximity to the cart. The lift platform 14 is provided with a stop rail 26 extending along its inner edge.

Referring next to FIGS. 4 and 5, the carriage, indicated generally at 27, preferably comprises tubular frame having opposing side frame members 28 and 29 and opposing end frame members 30 and 31, the upper edges of the frame members supporting a platform 32 on which a business machine is adapted to be seated, the business machine being secured to the platform by straps or other similar forms of attachment, not shown. Preferably, the frame members 28-31 will be of polygonal cross-section, the side frame members 28 and 29 having open-ended extensions 33 and 34 at their rear ends in which retractable handles 35 and 36 are telescopically received, the handles being seen in their extended position in FIG. 3, and seen with one of the handles retracted in FIG. 4. Rollers 37 are provided at the front end of the carriage to permit it to be rolled along the lift platform 14; and such rollers also may be used to transfer the carriage from the cart to a desk top or other supporting surface. On its underside, the carriage is provided at its rear side edge with a pair of rubber or similar resilient buttons or pads 38 which provide frictional engagement between the carriage and a supporting surface on which it is seated.

The undersurface of the carriage is also provided with a pair of generally V-shaped guide channels 39 and 40, the guide channels each having opposing inclined walls 41 and 42 terminating in a flat base wall 43. At their forward ends the guide channels have stop plates 44 which, as will be explained in greater detail hereinafter, coact with the guide wheels on the cart to assist in securing the carriage to the cart. The end frame member 31 is provided with openings 45 in alignment with the base walls 43 of the guide channels, the opening being adapted to receive locking pins which, as described hereinafter act to secure the carriage to the cart.

Figure 6:
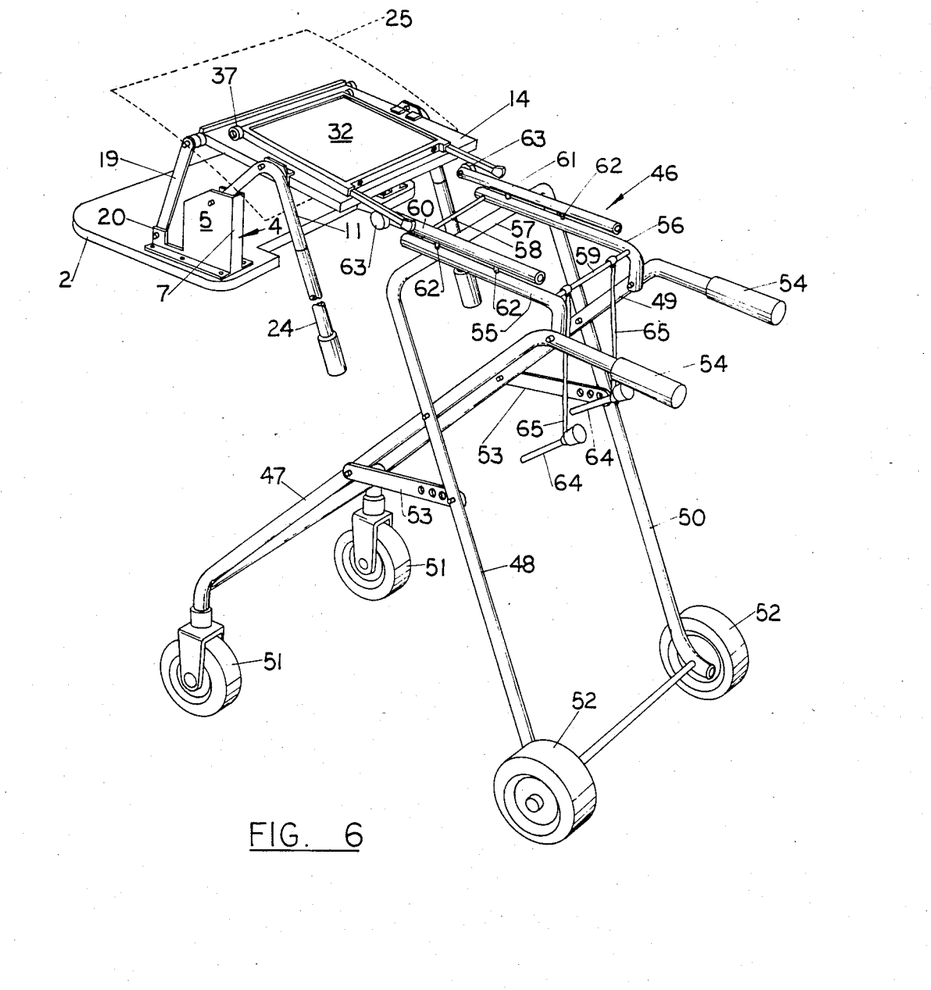
FIG. 6 is a perspective view of the lift mechanisms, carriage and cart in position for transfer of the carriage between the cart and the lift platform.

Referring next to FIG. 6, the cart is indicated generally by the reference number 46. The cart illustrated is exemplary only, it being understood that the base cart may take different specific forms, although preferably it will comprise a four-wheeled collapsible cart capable of being adjusted to vary its height. In the embodiment illustrated, the cart has opposing sets of frame members 47, 48 and 49, 50 pivotal interconnected intermediate their ends, the frame members 47 and 49 mounting caster wheels 51 at their lowermost ends, whereas the frame members 48 and 50 mount conventional wheels 52. The position of the sets of frame member 47, 48 and 49, 50 relative to each other may be adjusted by means of the adjustment link 53 which may be detached at one end to permit the legs to collapse or selectively adjusted in various positions of use to vary the height of the cart.

At their upper ends, the frame members 47 and 49 terminate in rearwardly extending handles 54 by means of which the cart may be pushed; and these frame members also pivotal mount frame members 55 and 56 which are supported toward their opposite ends by a cross-frame member 57 which, in the embodiment illusatrated, is integrally formed with the frame members 48 and 50. The frame member 55 and 56 are connected adjacent their opposite ends by cross bars 58 and 59.

In accordance with the invention, a pair of carriage receiving tubular members 60 and 61 are mounted on frame members 55 and 56, respectively, the carriage receiving members preferably being spaced upwardly from the frame members 55 and 56 by means of spacers 62. The effective height of the cart also may be adjusted by varying the length of the spacer 62 so that the tubular members 60 and 61 will be in proper alignment with the lift platform 14 when in its elevated position.

At their forward ends the carriage receiving members 60 and 61 mount guide wheels 63 which are adapted to engage in the guide channels 39 and 40 on the underside of the carriage. To this end, the carriage receiving tubular member 60 and 61 are spaced apart by the same distance as the guide channels 39 and 40.

Figure 7:
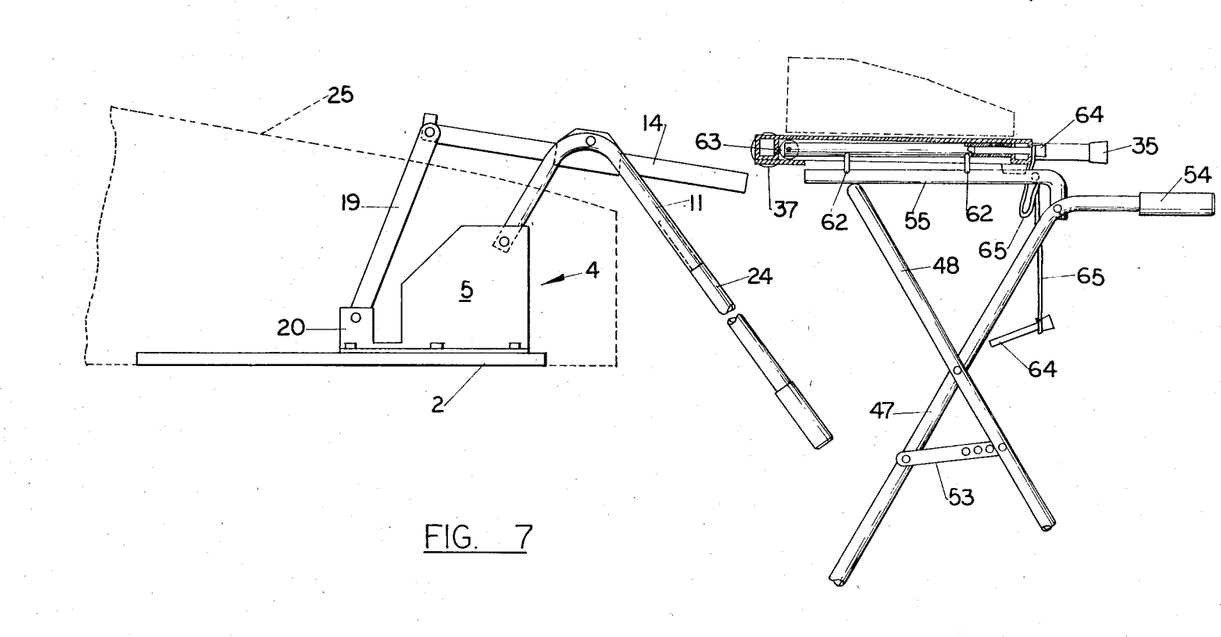
FIG. 7 is a side elevational view with parts in section illustrating the position of the carriage upon transfer from the lift platform to the cart.
Figure 8:
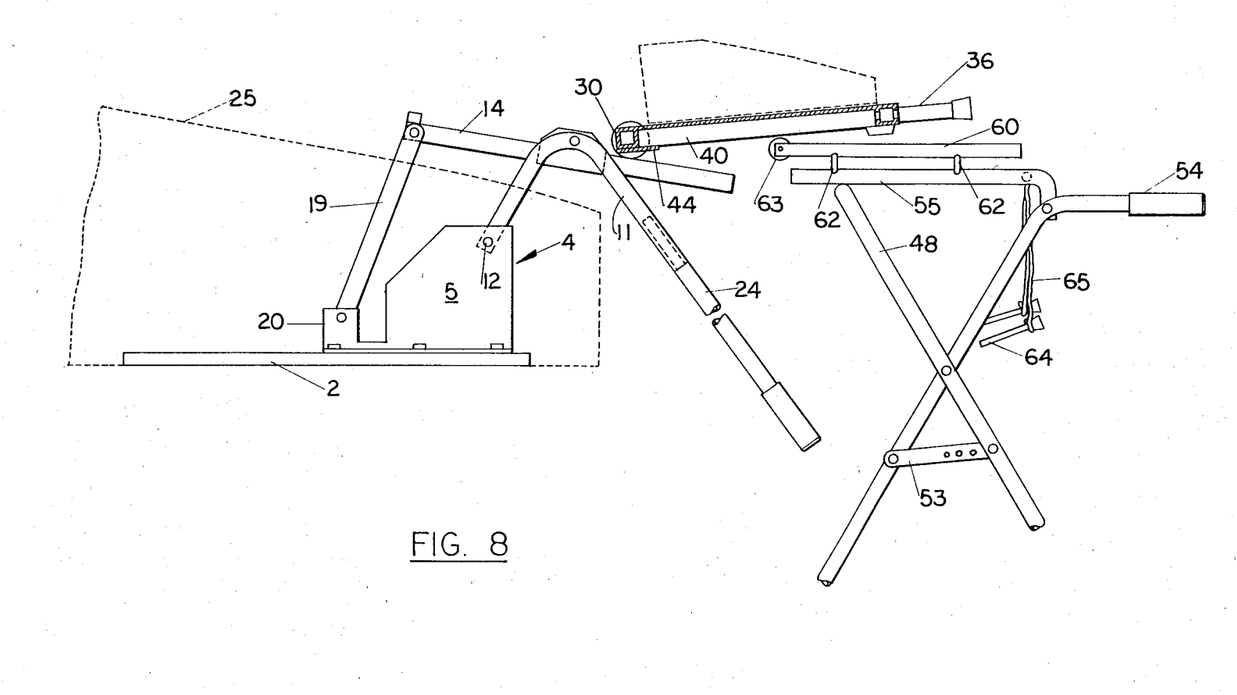
FIG. 8 is a side elevational view similar to FIG. 7 illustrating the transfer of the carriage between the cart and the lift platform.

As best seen in FIG. 8, as the carriage is transferred from the lift platform to the cart, the carriage will be manipulated so as to cause the guide wheels 63 on the cart to engage in the guide channels on the undersurface of the carriage, such as the channel 40 seen in FIG. 7. The V-shaped configuration of the guide channels acts to center the guide channels relative to the guide wheels 63 and the carriage receiving tubular members 60 and 61. As the carriage is moved into its fully seated position on the cart, the guide wheels 63 will abut against the inner side edge of end frame member 30 of the carriage and will seat on the stop plates 44. The length of the carriage receiving members 60 and 61 is such that when the guide wheels 63 are seated on the stop plates 44 and abut the end frame member 30, the entire lengths of the carriage receiving members 60 and 61 will be receiving within the confines of the guide channels 39 and 40, respectively, with the open rear ends of the carriage receiving member 60 and 61 in alignment with the openings 45 in the frame member 31 of the carriage, as will be evident from FIG. 7. When the carriage is fully seated on the member 60 and 61, the locking pins 64, which may be conveniently attached to the cross bar 59 by straps 65, may be inserted through opening 45 into the open ends of the tubular members 60 and 61, thereby locking the carriage to the cart. As in the case of the lifting handles 23 and 24, the locking pins 64 will be sized so as to be snuggly received within the tubular member 60 and 61, and if desired spring detents or other detachable locking devices may be used to maintain the locking pins in engagement with the frame members in which they are received. By reason of the stop plates 44 and the locking pins 64, the carriage will be firmly secured to the cart, and the carriage can only be released by removing the locking pins. Once the carriage is secured to the cart, the user may then retract the handles 35 and 36 and roll the cart away. The lift platform will be returned to its storage position, the lifting handles removed, and the trunk closed.

Figure 9:
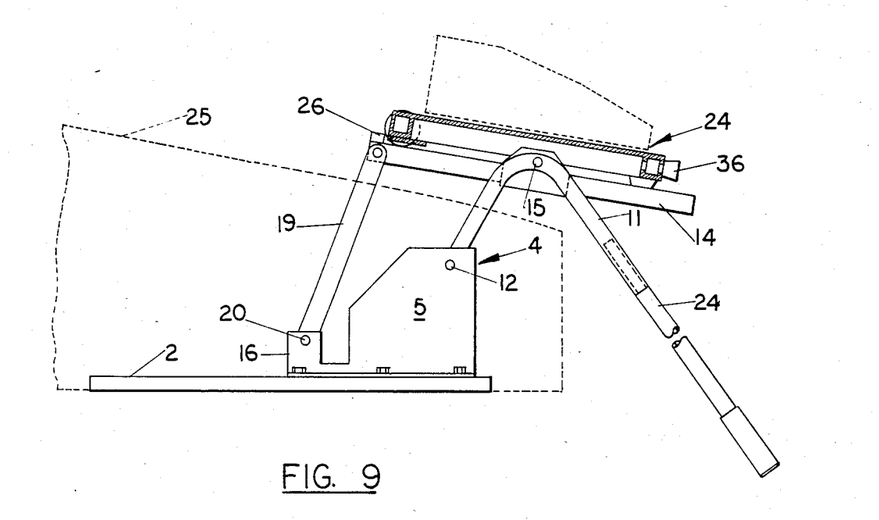
FIG. 9 is a side elevational view illustrating the position of the carriage after it has been transferred to the lift platform.
Figure 10:
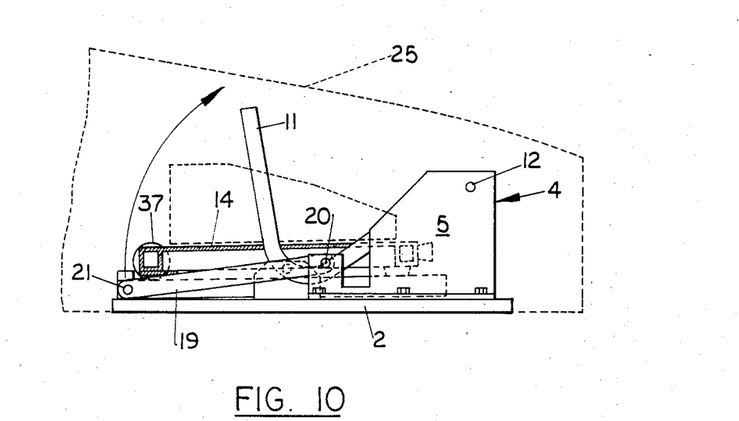
FIG. 10 is a side elevational view illustrating the carriage and lift platform in the storage position within the trunk.

When it is desired to return the business machine to the trunk of the vehicle, the trunk will be opened and the lift platform raised to its elevated position using the lift handles, whereupon the cart will be positioned in alignment with the lift platform, the handles 35 and 36 extended, and the locking pins removed. The carriage is then lifted by its handles and moved forwardly, the carriage first rolling on the guide wheels 63 on the front ends of tubular members 60, 61 until the rollers 37 on the leading edges of the carriage make contact with the lift platform, the carriage then being rolled on the lift platform until the rollers 37 contact the stop 26 at the far end of the lift platform, The retractable handles 35 and 36 are then retracted and the lift platform lowered into the trunk of the vehicle, the lift platform thus moving from the position seen in FIG. 9 to the position seen in FIG. 10, whereupon the lifting handles are removed and stored in the trunk. The cart may then be collapsed and stored in the trunk, or it may be stored elsewhere in the vehicle.

Figure 11:
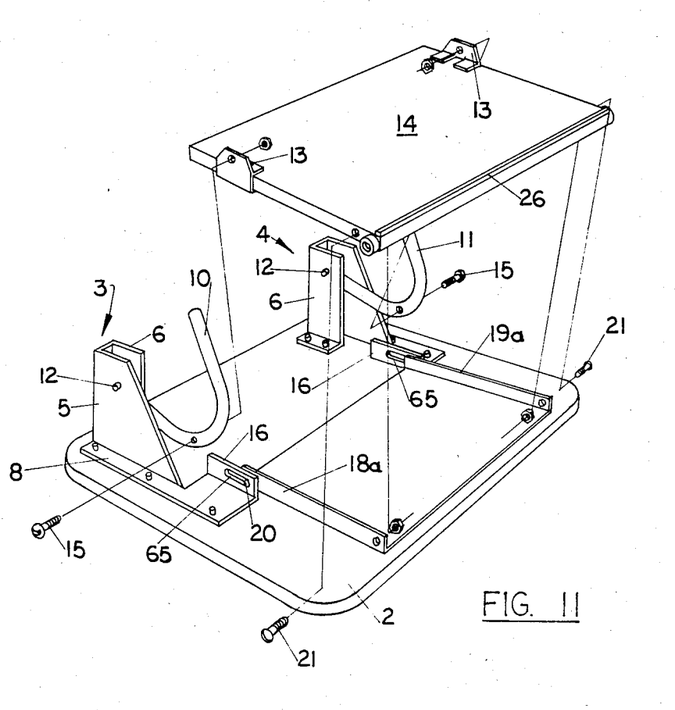
FIG. 11 is an exploded perspective view of a modified lifting mechanism.

In the embodiment of the invention illustrated in FIG. 11, wherein like parts are identified by like reference numbers, the extensions 16a are displaced inardly relatively to the outer walls 5 of the brackets 3 and 4 and provided with horizontally disposed slots 65 in which the pivot pins 20 are slidably received. The slots 65 permit the left platform 14 to move axially as it is raised and lowered. Such arrangement facilitates the movement of the lift platform and permits a higher load on the left platform due to the shifting of the pivot points. While placing the slots 65 in the brackets 3 and 4 is preferred, it will be evident that the slots could be formed in the lower ends of the lever arms 18a and 19a. In this connection, in the embodiment illustrated the support for the lift platform is increased by forming the lever arms 18a and 19a in a plate 66 which interconnects the arms and hence rigidifies the lifting mechanism.

Figure 12:
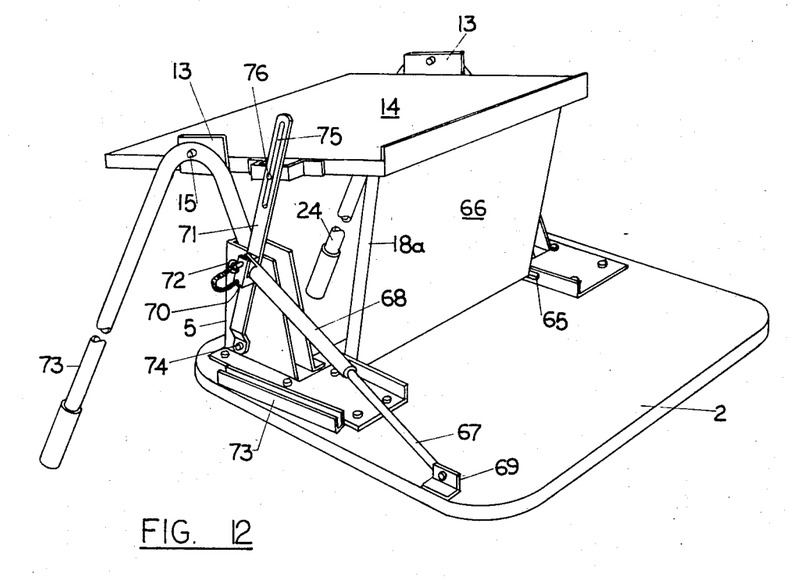
FIG. 12 is a perspective view of a further modification of the lift platform utilizing a gas spring assist.

FIG. 12 illustrates a further modification of the invention wherein a power assist in the form of a so-called gas spring is utilized to implement the raising and lowering of the lift platform. Such gas springs are of known construction and are adapted to be loaded when the rod 67 is displaced inwardly within the cylindrical casing 68 of the assist device. Thus the weight load of an article placed on the platform 14 will act together with the movement of the handles 23 and 24 to load the assist as the lift platform is moved to the storage position. When it is subsequently desired to raise the lift platform to its elevated position, the loaded rod 67 will move outwardly, thereby augmenting the lifting force applied to the handles 23 and 24.

In the embodiment illustrated the outer end of rod 67 is pivotally connected to a bracket 69 secured to base 2 by a ball joint connection (not shown). The far end of casing 68 is pivotally connected to a fitting 70 on lever arm 71 by means of a removable pivot pin 72. With this arrangement the casing 68 may be disconnected from the lever arm 71 and stored in the channel-shaped fixture 73 when not in use. This facilitates lowering of the lift platform 14 when there is no weight on the platform. At its lower end the lever arm 71 is pivotally connected to bracket 5 by means of pivot pin 74, and at its upper end the lever arm is provided with an elongated slot 75 engaged by a pin 76 projecting from a bracket 77 mounted on the side edge of the lift platform.

Figure 13:
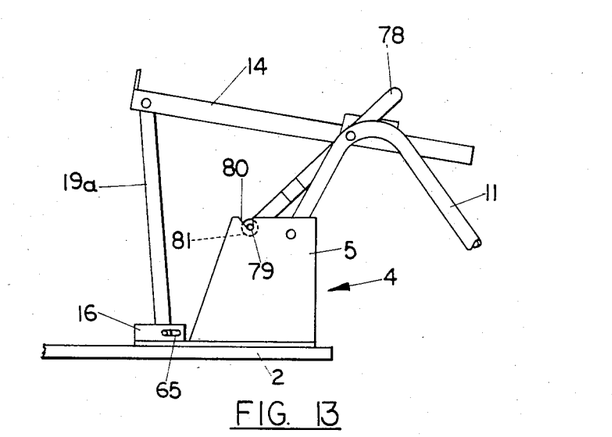
FIG. 13 is a partial side elevational view showing locking mechanism for the lift platform.

It has also been found desirable to provide a positive latch to secure the lift platform in its elevated position. A latch arrangement is seen in FIG. 13 wherein a latch arm 78 is pivotally connected to lift platform 14, the latch arm 78 having a pin 79 at its lower-most end engagable in a notch 80 in outer wall 5 of bracket 4. Preferably the pin 79 will also engage in a corresponding notch in the opposing inner wall 6 of the bracket 4, and a spacer 81 may be mounted in pin 80 to guide the lower end of lever arm 78 between the opposing walls of the bracket. As will be evident, the pin 79 will be removed from notches 80 when the lever arm is moved in a clockwise direction by the user.

Figure 14:
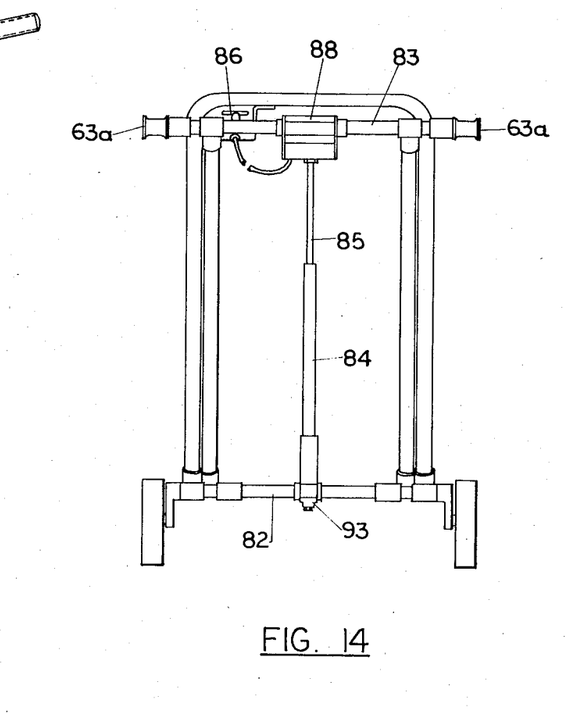
FIG. 14 is a front elevational view of a modified cart incorporating a gas spring assist.
Figure 15:
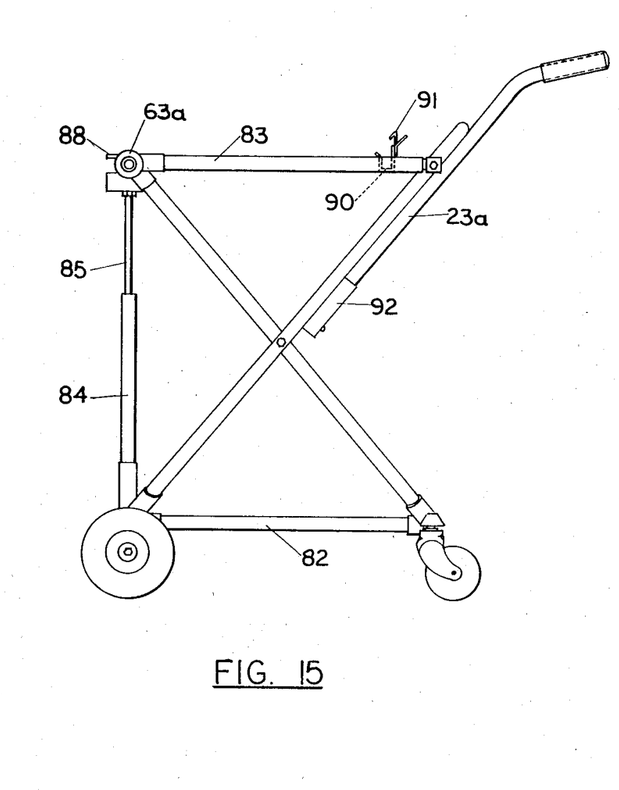
FIG. 15 is a side elevational view of the cart of FIG. 14.

FIGS. 14 and 15 illustrate a modified form of collapsible cart having a telescoping undercarriage 82 of known construction which permits the top of cart frame, indicated at 83, to be raised and lowered. In this embodiment a gas spring 84 having an extensible rod 85 is used as an assist in raising and lowering the cart, the gas spring extending between the undercarriage 82 and the top 83. The gas spring is of a known type which may be controlled by means of a hand control 86 which, when actuated, releases the rod 85 for movement relative to the gas spring 84. The gas spring will be loaded when the top 83 of the cart is lowered relative to the undercarriage 82, and the loaded spring will assist is raising the top to an elevated position. With such arrangement the top of the cart can be positioned to coincide with the lift platform of the trunk mechanism or with another supporting surface, such as a desk or table, to which a business machine or the like is to be transferred.

Figure 16:
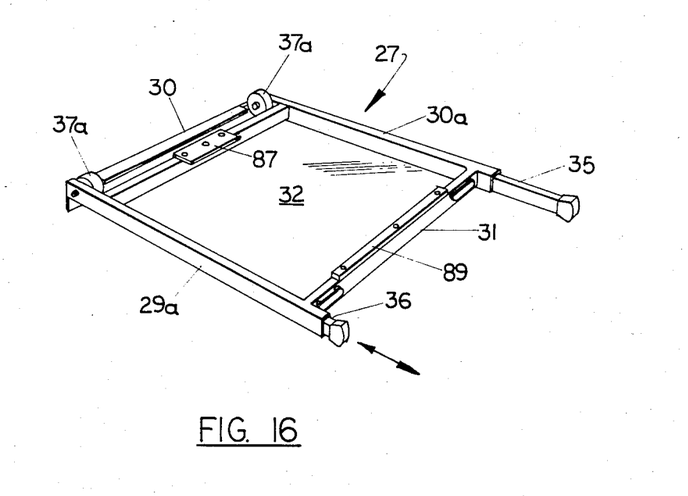
FIG. 16 is a perspective view of the underside of a modified carriage for use with the cart of FIGS. 14 and 15.

In this embodiment of the invention, the carriage 27, the underside of which is seen in FIG. 16, has been simplified, as has the manner in which it is attached to the cart. To this end the rollers 37a have been placed inboard with respect to the side frame members 28a and 29a which serve as the means for mounting the carriage on the cart, the cart as seen in FIG. 14, being provided with outboard guide rollers 63 which are configured to receive the undersides of the side frame members 28a and 29a. The carriage is secured to the top of the cart by means of a latch plate 87 (seen in FIG. 16) which engages beneath a tongue 88 (seen in FIGS. 14 and 15) which project outwardly from the top of the cart, and by the transverse locking bar 89 at the opposite end of the carriage (see FIG. 16) which is adapted to seat in the transverse channel 90 (see FIG. 15). The carriage is detatchably secured with the locking bar seated in the channel 90 by one or more spring biased latches 91 which engage the carriage.

The cart construction of FIG. 15 also permits dual use of the lifting handles 23 and 24 used to raise and lower the lift platform. To this end, the cart frame is provided with sockets 92 of a size to detatchably receive the handles 23a (and 24a not shown). Thus, when the lift platform is in its elevated position, the lift handles may be removed and inserted in the sockets 92 of the cart. After the cart has been used and returned to the vehicle, the handles can be removed from the cart and reinserted in the ends of lever arms 10 and 11 of the lift mechanism. Since it is intended that the cart will be collapsed and stored in the vehicle, the handles will have been removed for separate storage, and the cart itself may be collapsed in conventional fashion after disconnecting the lower end of gas spring 84 from the undercarriage 82, the gas spring being provided at its lower end with a detachable fastener 93.

As should now be apparent, the present invention provides a trunk loading device by means of which a business machine or other bulky article may be readily transferred to and from the trunk of the vehicle. The trunk loading mechanism may be used as such for numerous purposes, such as loading and unloading luggage or other bulky objects, or it may be used in conjunction with the cart and carriage to transport business machines for demonstration purposes. As compared with prior art structures, the device is relatively simple and easy to use, and has the advantage that substantially any conventional cart may be adapted to receive the carriage used to transfer the business machine between the cart and the lifting mechanism in the trunk.

What is claimed is:

1. Lifting mechanism for transferring bulky articles to and from the trunk of a vehicle, said lifting mechanism comprising a base adapted to be seated on the floor of the trunk, a lift platform overlying said base, sets of lever arms pivotally interconnected said base and said lift platform, bracket means projecting upwardly from said base on each side of said lift platform, a first set of said lever arms having angularly related linear end portions joined by a curved central portion, the lever arms in said first set being pivotally connected to said bracket means at pivot points spaced upwardly from said base and pivotally connected to said lift platform at their curved central portions, a second set of lever arms, the lever arms in said second set being linear and pivotally connected at one end to said bracket means in close proximity to said base and pivotally connected at their opposite ends to said lift platform, said lift platform being movable from a storage position in which it is seated on said base to an elevated position in which the lift platform projects outwardly from the trunk of the vehicle, and detachable handle means engagable with said first set of said lever arms, whereby said first set of lever arms may be moved by said handle means to raise and lower said lift platform.

2. The lift mechanism claimed in claim 1 wherein said detachable handle means are engagable with the opposite ends of said first set of lever arms.

3. The lift mechanism claimed in claim 2 including stop means engagable with said first set of lever arms to establish the elevated position of said lift platform.

4. The lift mechanism claimed in claim 1 including power lifting means extending between said base and said lift platform to assist in moving said lift platform between its storage and elevated positions.

5. The lift mechanism claimed in claim 4 wherein said powered lift means comprises a gas spring.

6. The lift mechanism claimed in claim 5 wherein said powered lift means includes a lever arm pivotally connected to said base and pivotally and slidably connected to said lift platform, said gas spring being connected at one end to said base and at its opposite end to said lever arm intermediate its length.

7. The lift mechanism claimed in claim 1 wherein said bracket means have inner and outer walls, the first pair of lever arms lying between the inner and outer walls of said brackets and being pivoted thereto by pivot pins extending between the walls.

8. The lift mechanism claimed in claim 7 wherein the inner and outer walls of said bracket means are interconnected by end walls, and wherein said first pair of lever arms will contact the upper edges of said end walls when said lift platform is elevated, the end walls serving as stops acting to establish the fully elevated position of said lift platform.

9. The lift mechanism claimed in claim 8 including a stop rail on said lift platform.

10. The lift mechanism claimed in claim 1 including releasable locking means for securing said lift platform in the elevated position.

11. The lifting mechanism claimed in claim 1 in combination with a cart comprising a cart frame having a top and bottom, wheels at the bottom of said cart frame, and an article receiving carriage adapted to be seated on the top of said cart frame, means detachably securing said carriage to the top of said cart frame, said carriage having a leading end and a trailing end, rollers mounted on the leading end of said carriage, and retractable handles at the trailing end of said carriage, whereby said cart may be positioned adjacent said lift platform when in its elevated position and the carriage transferred between said cart and said lift platform by lifting the trailing end of said carriage by its handles and moving the carriage relative to the top of said cart and said lift platform.

12. The lifting mechanism claimed in claim 11 wherein the top of said cart is vertically adjustable relative to the bottom of said cart frame, and powered lifting means extending between the top and bottom of said cart frame to assist in raising and lowering the top of said cart frame relative to its bottom.

13. The lifting mechanism claimed in claim 12 wherein said powered lift means comprises a gas spring.

14. The lifting mechanism claimed in claim 11 including sockets on said cart frame for receiving the detachable handles for raising and lowering said lift platform, whereby the said handles may be used both for the lift mechanism and for the cart.

* * * * *